(12) United States Patent
Li et al.

(10) Patent No.: US 12,199,775 B2
(45) Date of Patent: Jan. 14, 2025

(54) CODEBOOK FEEDBACK METHOD AND APPARATUS, DEVICE, AND STORAGE MEDIUM

(71) Applicant: ZTE Corporation, Guangdong (CN)

(72) Inventors: Xincai Li, Guangdong (CN); Yajun Zhao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 333 days.

(21) Appl. No.: 17/764,150

(22) PCT Filed: Sep. 27, 2020

(86) PCT No.: PCT/CN2020/118145
§ 371 (c)(1),
(2) Date: Mar. 25, 2022

(87) PCT Pub. No.: WO2021/057977
PCT Pub. Date: Apr. 1, 2021

(65) Prior Publication Data
US 2022/0353019 A1    Nov. 3, 2022

(30) Foreign Application Priority Data
Sep. 26, 2019   (CN) .................. 201910920092.8

(51) Int. Cl.
*H04L 1/1812* (2023.01)
*H04L 1/1607* (2023.01)
(Continued)

(52) U.S. Cl.
CPC .......... *H04L 1/1812* (2013.01); *H04L 1/1678* (2013.01); *H04L 5/0055* (2013.01); *H04W 72/23* (2023.01)

(58) Field of Classification Search
CPC ... H04L 1/1812; H04L 1/1678; H04L 5/0055; H04W 72/23
See application file for complete search history.

(56) References Cited

U.S. PATENT DOCUMENTS

| | | | |
|---|---|---|---|
| 2019/0261331 A1* | 8/2019 | Guthmann | H04L 5/0007 |
| 2020/0313807 A1* | 10/2020 | Salem | H04L 1/1607 |

(Continued)

FOREIGN PATENT DOCUMENTS

| | | |
|---|---|---|
| CN | 107294660 A | 10/2017 |
| CN | 109075914 A | 12/2018 |

(Continued)

OTHER PUBLICATIONS

Chinese First Search Report dated Aug. 8, 2023, in connection with Chinese Application No. 2019109200928.

(Continued)

*Primary Examiner* — Siming Liu
(74) *Attorney, Agent, or Firm* — Wolf, Greenfield & Sacks, P.C.

(57) ABSTRACT

Provided are a codebook feedback method, a codebook feedback apparatus, a device, and a storage medium. The codebook feedback method includes: triggering, according to control information (CI), a hybrid automatic repeat request-acknowledgement (HARQ-ACK) codebook of a data channel group to perform feedback, where the CI includes at least one of: information of new feedback indication (NFI) corresponding to one or more data channel groups, a data channel group identifier and a group index corresponding to a currently scheduled data channel, or, a total downlink assignment index (T-DAI) corresponding to one or more data channel groups.

20 Claims, 3 Drawing Sheets

Trigger, according to control information (CI), a hybrid automatic repeat request-acknowledgement (HARQ-ACK) codebook of a data channel group to perform feedback, where the CI includes at least one or more of: information of new feedback indication (NFI) corresponding to one or more data channel groups, a data channel group identifier and a group index corresponding to a currently scheduled data channel, or, a total downlink assignment index (T-DAI) corresponding to one or more data channel groups ⸺ S110

(51) Int. Cl.
  *H04L 5/00* (2006.01)
  *H04W 72/23* (2023.01)

(56) References Cited

U.S. PATENT DOCUMENTS

2021/0029641 A1* 1/2021 Khoshnevisan ...... H04L 1/1851
2022/0232601 A1* 7/2022 Lin ...................... H04L 1/1812

FOREIGN PATENT DOCUMENTS

| CN | 110557233 A | 12/2019 |
|----|-------------|---------|
| WO | WO 2010/123267 A2 | 10/2010 |
| WO | WO 2017/171299 A1 | 10/2017 |
| WO | WO 2019/051085 A1 | 3/2019 |
| WO | WO 2019/095314 A1 | 5/2019 |

OTHER PUBLICATIONS

Chinese Office Action dated Sep. 11, 2023, in connection with Chinese Application No. 201910920092.8.
Extended European Search Report dated Oct. 5, 2023, in connection with European Application No. EP 20869630.2-1213.
[No Author Listed] Feature lead summary #2 of HARQ enhancements for NR-U. 3GPP TSG RAN WG1 Meeting #98. R1-1909694. Aug. 26-30, 2019. 29 Pages.
Japanese Notice of Refusual dated May 5, 2023, in connection with Japanese Application No. 2022-519590.
[No Author Listed], Consideration on UCI enhancements for URLLC. 3GPP TSG RAN WG1 Meeting #96. R1-1902177. Sony. Feb. 25-Mar. 1, 2019. 9 pages.
[No Author Listed], Transmission with Configured grant in NR unlicensed band. 3GPP TSG RAN WG1 Meeting #98. R1-1908112. HiSilicon Huawei. Aug. 26-30, 2019. 20 pages.
[No Author Listed], HARQ procedure for NR-U. 3GPP TSG RAN WG1 #98. R11908537. LG Electronics. Aug. 26-30, 2019. 21 Pages.
[No Author Listed], Enhancements to Scheduling and HARQ operation for NR-U. 3GPP TSG RAN WG1 Meeting #98. R1-1909247. Qualcomm Incorporated. Aug. 26-Aug. 30, 2019. 21 pages.
Indian Examination Report mailed Sep. 7, 2022, in connection with Indian Application No. IN 20227024562.
International Search Report mailed Jan. 4, 2021 in connection with International Application No. PCT/CN2020/118145.
[No Author Listed], Harq enhancement for NR-U. 3GPP TSG RAN WG1 Meeting #96bis. R1-1904599. Panasonic. Apr. 8-12, 2019. 8 pages.
[No Author Listed], Discussion on scheduling and HARQ for NR-U. 3GPP TSG RAN WG1 Meeting #96bis. R1-1903875. ZTE, Sanechips. Apr. 8-12, 2019. 7 pages.
Chinese Search Report dated Jul. 29, 2024, in connection with Chinese Application No. 201910920092, with English translation thereof.
Chinese Office Action dated Jul. 31, 2024, in connection with Chinese Application No. 201910920092, with English translation thereof.
Korean Office Action dated Jul. 16, 2024, in connection with Korean Application No. 10-2022-701394, with English translation thereof.
[No Author Listed], Enhancements to HARQ for NR-unlicensed. 3GPP TSG RAN WG1 Meeting #98. Intel Corporation. Aug. 26-30, 2019. 11 pages.
Huiying, LTE-Advanced Key Technologies and Its Standardization Status. Telecommunications Network Technology. Dec. 15, 2009. 4 pages.
Qiubin et al., Analysis on massive beamfoaming in the 5G Nr. Information and Communications Technology and Policy. Nov. 15, 2018. 7-14.

* cited by examiner

FIG. 1

Trigger, according to control information (CI), a hybrid automatic repeat request-acknowledgement (HARQ-ACK) codebook of a data channel group to perform feedback, where the CI includes at least one or more of: information of new feedback indication (NFI) corresponding to one or more data channel groups, a data channel group identifier and a group index corresponding to a currently scheduled data channel, or, a total downlink assignment index (T-DAI) corresponding to one or more data channel groups — S110

CODEBOOK FEEDBACK METHOD AND APPARATUS, DEVICE, AND STORAGE MEDIUM

This application claims priority to Chinese Patent Application No. 201910920092.8 filed in the Chinese Patent Office on Sep. 26, 2019, the disclosure of which is incorporated herein by reference in its entirety.

CROSS-REFERENCE TO RELATED APPLICATION(S)

This is a national stage application filed under 35 U.S.C. § 371 based on International Patent Application Serial No. PCT/CN2020/118145, filed Sep. 27, 2020, entitled CODEBOOK FEEDBACK METHOD AND APPARATUS, DEVICE, AND STORAGE MEDIUM, which claims priority to Chinese Patent Application No. 201910920092.8 filed in the Chinese Patent Office on Sep. 26, 2019, the disclosures of which are incorporated herein by reference in their entirety.

FIELD

The present disclosure relates to radio communication networks, for example, to a codebook feedback method, a codebook feedback apparatus, a device, and a storage medium.

BACKGROUND

According to regulatory requirements for unlicensed carrier operation, a device is required to perform clear channel assessment (CCA) before performing data transmission, and only in case of a successful CCA, the device is allowed to transmit data at a corresponding resource position. In case of a failed CCA, a feedback for hybrid automatic repeat request-acknowledgement (HARQ-ACK) codebook would not be allowed to be transmitted.

SUMMARY

A codebook feedback method, a codebook feedback apparatus, a device, and a storage medium are provided according to the present disclosure, which provides multiple opportunities for codebook feedback to improve system performance.

The codebook feedback method provided according to embodiments of the present disclosure, includes:

triggering, according to control information (CI), a hybrid automatic repeat request-acknowledgement (HARQ-ACK) codebook of a data channel group to perform feedback, where the CI includes at least one of: information of new feedback indication (NFI) corresponding to one or more data channel groups, a data channel group identifier and a group index corresponding to a currently scheduled data channel, or, a total downlink assignment index (T-DAI) corresponding to one or more data channel groups.

A codebook feedback apparatus is provided according to embodiments of the present disclosure, includes:

a feedback triggering module configured to trigger a hybrid automatic repeat request-acknowledgement (HARQ-ACK) codebook of a data channel group to perform feedback according to control information (CI), where the CI includes at least one of: information of new feedback indication (NFI) corresponding to one or more data channel groups, a data channel group identifier and a group index corresponding to a currently scheduled data channel, or, a total downlink assignment index (T-DAI) corresponding to one or more data channel groups.

A user equipment is provided according to embodiments of the present disclosure, which includes:

one or more processors; and a memory, which is configured to store one or more programs;

where, the one or more programs, when being executed by the one or more processors, cause the one or more processors to implement the codebook feedback method described above.

A storage medium is provided according to embodiments of the present disclosure, which stores a computer program, and the computer program, when executed by a processor, implements any method in the embodiments of the present disclosure.

DETAILED DESCRIPTION

Embodiments of the present disclosure will be described hereinafter in detail with reference to the drawings. It is to be noted that if not in conflict, the embodiments and features therein in the present disclosure may be flexibly combined with each other.

The operations illustrated in the flowchart of the drawings may be performed by a computer system such as a set of computer-executable instructions. Although a logical sequence is shown in the accompany flowchart, the operations shown or described may be performed in a sequence different from that described herein in some cases.

The technical solution of the present disclosure can be applied to various communication systems, such as a global system of mobile communication system (GSM), a code division multiple access (CDMA) system, a wideband code division multiple access (WCDMA) system, a general packet radio service (GPRS), a long term evolution (LTE) system, an advanced long term evolution (LIE-A) system, an universal mobile telecommunication system (UMTS), and a 5th generation mobile networks system (5G) system, and the embodiments of the present disclosure is not limited thereto. In the present disclosure, description is illustrated by taking a 5G system as an example.

Figure 1:
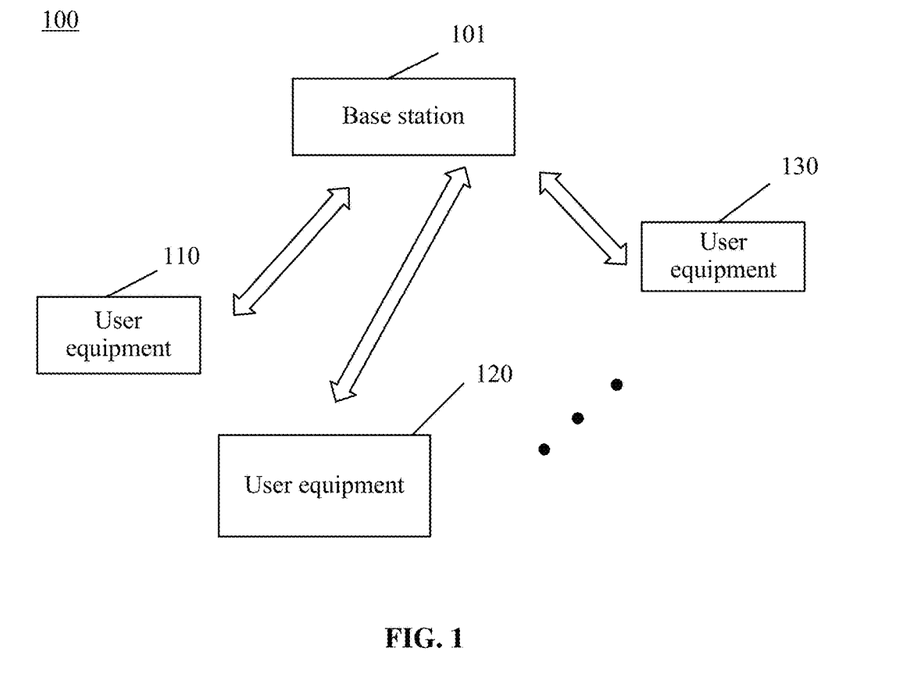
FIG. 1 is a schematic structural diagram of a radio network system according to the present disclosure.

The embodiments of the present disclosure may be applied in radio networks of different standards. A radio access network may include different communication nodes in different systems. FIG. 1 is a schematic structural diagram of a radio network system according to the present disclosure. As shown in FIG. 1, the radio network system 100 includes a base station 101, a user equipment 110, a user equipment 120, and a user equipment 130. The base station 101 performs wireless communication with the user equipment 110, the user equipment 120, and the user equipment 130, respectively.

In the embodiments of the present disclosure, the base station may be a device capable of communicating with the user equipment. The base station may be any device having a radio transceiver function, including but not limited to a base station NodeB, an evolved base station eNodeB, a base station in a 5G communication system, a base station in a future communication system, an access node in a WiFi system, a wireless relay node, a wireless backhaul node, and the like. The base station may also be a wireless controller in a cloud radio access network (CRAN) scenario, or, may also be a small base station, a transmission reference point (TRP), or the like, which is not limited in the embodiments of the present disclosure.

The user equipment is a device having a radio transceiver function. The user equipment may be deployed on land, including indoor or outdoor, hand-held, worn or in-vehicle. The user equipment may also be disposed on water (such as in a ship, and etc.). The user equipment may also be deployed in air (such as in an aircraft, in a balloon, in a satellite, and etc.). The user equipment may be a mobile phone, a portable android device (Pad), a computer with a radio transceiver function, a virtual reality (VR) terminal, an augmented reality (AR) terminal, a wireless terminal in an industrial control, a wireless terminal in self driving, a wireless terminal in a remote medical, a wireless terminal in a smart grid, a wireless terminal in a transportation safety, a wireless terminal in a smart city, a wireless terminal in a smart home, or the like. The application scenarios are not limited in the embodiments of the present disclosure. The user equipment may sometimes be referred to as a terminal, an access terminal, a user equipment (UE) unit, a UE station, a mobile station, a remote station, a remote terminal, a mobile device, a UE terminal, a radio communication apparatus, a UE agent, a UE device, or the like, which is not limited in the embodiments of the present disclosure.

5G New Radio (5G NR) faces many issues when being operated with unlicensed carriers. First, in some countries and regions, there are corresponding regulatory policies for the use of unlicensed spectrums. For example, before transmitting data using an unlicensed carrier, a device must perform listen before talk (LBT), also referred to as CCA. Only in a case of a successful CCA, the device is allowed to transmit data on a resource corresponding to the unlicensed carrier. For example, when performing HARQ-ACK feedback, in case of a failed CCA, the HARQ-ACK feedback information will not be allowed to transmit.

The NR downlink scheduling data signal and the HARQ feedback mechanism are such that the base station includes a piece of PDSCH-to-HARQ-timing-indicator information into a downlink control information (DCI) for scheduling a downlink physical shared channel (PDSCH), to notify the UE to feed back a specific time domain position of the ACK/NACK, with a timing amount range of {0.15}. If multiple pieces of acknowledgement/non-acknowledgement (ACK/NACK) information corresponding to PDSCHs are fed back at time domain positions in a same slot, multiple pieces of ACK/NACK information are fed back in one uplink physical control channel (PUCCH) in a form of an HARQ-ACK codebook.

In addition, for uplink autonomous data transmission, if the base station feeds back one DCI containing ACK/NACK information to each UE, the overhead would be very large.

Figure 2:
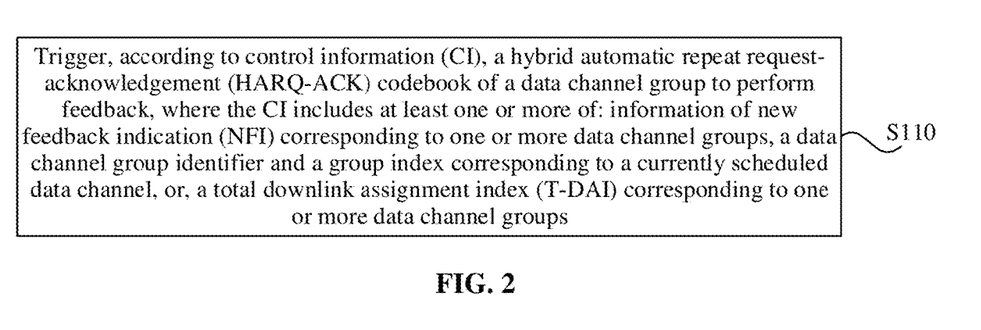
FIG. 2 is a schematic flowchart of a codebook feedback method according to the present disclosure.

In one exemplary implementation, FIG. 2 is a schematic flowchart of a codebook feedback method according to the present disclosure. The method is applicable to a case where a HARQ-ACK codebook feedback is performed when the NR uses unlicensed carriers. The method may be performed by a codebook feedback apparatus according to the present disclosure, which may be implemented by software and/or hardware and integrated on a base station.

As shown in FIG. 2, the codebook feedback method according to the present disclosure mainly includes:

in S110, triggering, according to control information (CI), a hybrid automatic repeat request-acknowledgement (HARQ-ACK) codebook of a data channel group to perform feedback. The CI includes at least one of: information of new feedback indication (NFI) corresponding to one or more data channel groups, a data channel group identifier and a group index corresponding to a currently scheduled data channel, or, a total downlink assignment index (T-DAI) corresponding to one or more data channel groups.

In the present embodiments, the HARQ-ACK codebook includes multiple pieces of ACK/NACK information, and the ACK information is a control character of transmission type and is sent from a receiving station to a transmitting station, indicating confirming that transmitted data has been received correctly. The NACK information is a control character of transmission type sent from a receiving station to a transmitting station, indicating that the transmitted data has been received incorrectly or has not been received.

In the present embodiments, for downlink HARQ-ACK codebook feedback, in order to provide multiple transmission opportunities for unlicensed ACK/NACK feedback, a mechanism for triggering one or more PDSCH groups to perform HARQ codebook feedback, is necessary to be introduced.

In the present embodiments, the CI is downlink control information DCI, and the DCI includes fallback DCI and non-fallback DCI.

The fallback DCI is a DCI of format 1_0, and the non-fallback DCI is a DCI of format 1_1. A number of bits of each DCI information domain and a value range of each DCI information domain included in the fallback DCI are not configurable; while the number of bits of each DCI information domain and/or the value range of each DCI information domain in the non-fallback DCI are configurable. Specifically, taking K1 as an example, a set of values of K1 supported in the fallback DCI is specified in protocol as including {0-15}. The set of values of K1 supported in the non-fallback DCI is configured by a network side through a radio resource control (RRC) signaling. In order to ensure system detection performance, the fallback DCI contains relatively fewer bits, and generally would not contain too many bits in subsequent evolution.

In one exemplary embodiment, the HARQ-ACK codebook includes at least one of: an HARQ-ACK codebook of a currently scheduled data channel group, an HARQ-ACK codebook of a data channel group scheduled before a current time point, an HARQ-ACK codebook of a data channel group first triggered, an HARQ-ACK codebook of a data channel group re-triggered, an HARQ-ACK codebook of a data channel group autonomously transmitted, or an HARQ-ACK codebook of a data channel group semi-continuously scheduled.

In one exemplary embodiment, the triggering, according to control information (CI), a hybrid automatic repeat request-acknowledgement (HARQ-ACK) codebook of a data channel group to perform feedback includes: triggering, through the non-fallback DCI, an HARQ-ACK codebook corresponding to one or more data channel groups to perform feedback; and, feeding back, according to a preset method, an HARQ-ACK codebook corresponding to a data channel group to which data channels scheduled through the fallback DCI belong.

In one exemplary embodiment, a mechanism for the DCI to trigger an HARQ-ACK codebook corresponding to one or more data channel groups to perform feedback is described.

In the present embodiments, the base station triggers an HARQ-ACK codebook corresponding to one or more PDSCH groups, through the non-fallback DCI, to perform feedback. The PDSCH group includes: a currently scheduled PDSCH group, a PDSCH group scheduled before a current time point, a PDSCH group first triggered, a PDSCH group re-triggered, a PDSCH group transmitted autonomously, and a PDSCH group scheduled semi-continuously.

PDSCHs contained in each PDSCH group are dynamically indicated though a data channel group identifier for triggering feedback. The ACK/NACK information of a same PDSCH group is fed back on a same PUCCH. The UE feeds back the ACK/NACK information corresponding to the triggered PDSCH group on corresponding time-frequency resources according to a timing relationship and frequency domain resource indication information which are included in the DCI.

For example, for the case where two PDSCH groups are triggered through the DCI, one bit of data channel group identifier, one bit of group index corresponding to a current scheduled data channel, one or two bits of information of new feedback indication (NFI), and two bits of total downlink assignment index T-DAI are required to be added on a base of the DCI for the non-fallback DCI. The data channel group identifier is used to indicate a PDSCH group to which the currently scheduled PDSCHs belong, the group index corresponding to the currently scheduled data channel is used to indicate to feed back only the HARQ-ACK codebook of the PDSCH group to which the currently scheduled PDSCH belongs or to feed back the HARQ-ACK codebooks corresponding to all the PDSCH groups, the information of new feedback indication (NFI) is used to indicate whether the PDSCH group scheduled this time or other PDSCH group triggered this time is a PDSCH group currently scheduled, or is used to indicate whether the PDSCH group scheduled this time or the other PDSCH group triggered this time further includes a previous PDSCH group in addition to current scheduled PDSCH group, and the T-DAI information is corresponding to a PDSCH group which is not scheduled but an HARQ-ACK codebook corresponding which is triggered to perform feedback.

In one exemplary embodiment, a process in which a base station triggers an HARQ-ACK codebook corresponding to one or more PDSCH groups through non-fallback DCI to perform feedback is described.

In the present embodiments, the HARQ-ACK codebook is determined according to the data channel group identifier and information of corresponding new feedback indication; and the HARQ-ACK codebook is fed back.

First, a maximum number of PDSCH groups which HARQ-ACK codebook corresponding to are triggered through the non-fallback DCI to perform feedback is pre-defined or is configured through higher level signaling. The maximum number of PDSCH groups may be two or four.

The PDSCH groups triggered to perform HARQ-ACK codebook feedback is determined according to the data channel group identifier for triggering given directly in the non-fallback DCI. For example, for a case where four PDSCH groups are configured, three bits may be defined to indicate the groups which a codebook corresponding to is triggered to perform feedback. Alternatively, the PDSCH groups which an HARQ-ACK codebook corresponding to is triggered to perform feedback is determined through a bitmap of configured groups in a one-to-one correspondence manner. For example, for a case where four PDSCH groups are configured, four bits may be defined to correspond to each group from a highest bit to a lowest bit. For example, the four bits of 1001 represents to trigger an HARQ-ACK codebook corresponding to a first group and a fourth group to perform feedback.

In the present embodiments, determining the HARQ-ACK codebook according to the data channel group identifier and information of corresponding new feedback indication includes: determining a data channel group triggered for feedback according to the data channel group identifier; in a case where the information of new feedback indication (NFI) corresponding to the data channel group is not inverted, determining ACK/NACK information pre-stored in the data channel group to which the currently scheduled data channels belong and ACK/NACK information corresponding to the currently scheduled data channels as the HARQ-ACK codebook; and in a case where the information of new feedback indication (NFI) corresponding to the data channel group is inverted, discarding the ACK/NACK information pre-stored in the data channel group to which the scheduled data channels belong, and determining the ACK/NACK information corresponding to the currently scheduled data channels as the HARQ-ACK codebook.

Figure 3:
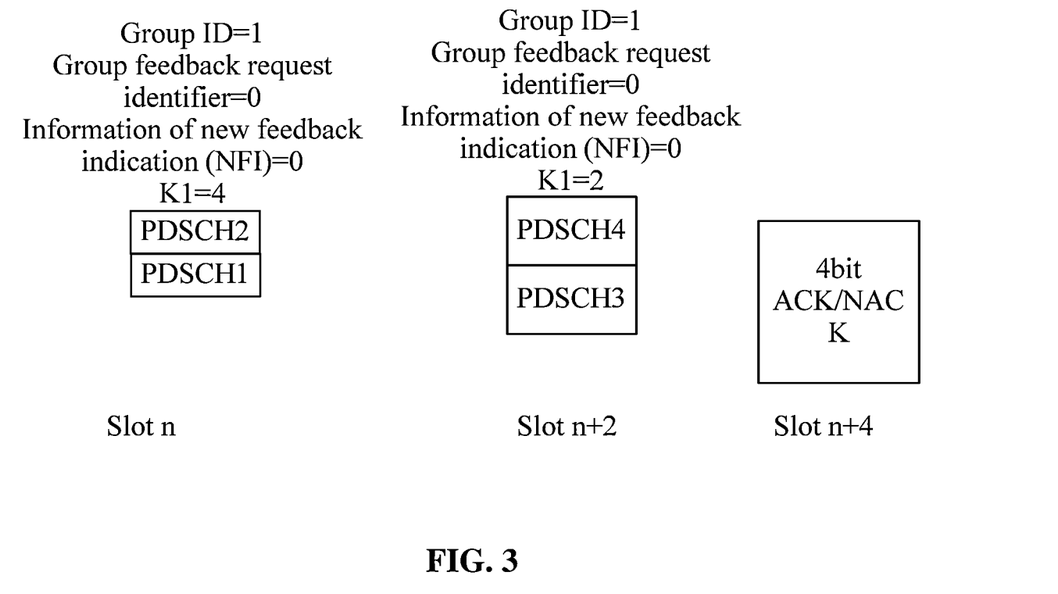
FIG. 3 is a schematic structural diagram of HARQ-ACK codebook determination according to the present disclosure.

For example, FIG. 3 is a schematic structural diagram of HARQ-ACK codebook determination according to the present disclosure. As shown in FIG. 3, the base station configures that the maximum number of PDSCH groups triggered through the non-fallback DCI is two, the base station schedules PDSCH1 and PDSCH2 through the non-fallback DCI in slot n, and the PDSCH group indicates Group ID=1, that is, the HARQ-ACK codebook corresponding to the PDSCH group with data channel group identifier as Group ID=1 is triggered to perform feedback, which may be indicated through one bit of signalling value as 0 by the base station. Moreover, the base station further provides one bit of information of new feedback indication (NFI) for notifying the UE whether all the HARQ-ACK codebooks corresponding to previously scheduled PDSCHs included in the PDSCH group scheduled this time have been successfully received. If the information of new feedback indication (NFI) is inverted, that is, the information of new feedback indication (NFI) being NFI=1, it indicates that the HARQ-ACK information corresponding to the previously scheduled PDSCHs of the PDSCH group has been correctly received, and the PDSCHs included in the PDSCH group currently scheduled are only the PDSCHs currently scheduled. If the information of new feedback indication (NFI) is not inverted, that is, the information of new feedback indication (NFI) being NFI=0, it indicates that the HARQ-ACK information corresponding to the previously scheduled PDSCHs included in the PDSCH group scheduled this time has not been successfully received, the HARQ-ACK information corresponding to the previously scheduled PDSCHs in the PDSCH group and the ACK/NACK information corresponding to the currently scheduled data channels are required to be fed back.

After receiving the non-fallback DCI, the UE is required to determine an HARQ-ACK codebook to be transmitted according to the data channel group identifier and whether the corresponding information of new feedback indication (NFI) is inverted. If the information of new feedback indication (NFI) corresponding to this PDSCH group is not inverted, the UE is required to feed back previously stored ACK/NACK information corresponding to the PDSCHs included in the PDSCH group to the base station through an HARQ-ACK codebook.

For example, at slot n+2 in FIG. 3, the base station still triggers the HARQ-ACK codebook corresponding to the PDSCH group with the data channel group identifier as Group ID=1 to perform feedback, and the information of new feedback indication (NFI) meets NFI=0, i.e., is not inverted, so the UE may accordingly feed back the ACK/NACK information corresponding to all the PDSCHs included in the PDSCH groups from slot n+2 to a current time, including 4-bit ACK/NACK information in total. If the information of new feedback indication (NFI) corresponding to the PDSCH group meets NFI=1, i.e., is inverted, the UE may discard the previously stored ACK/NACK information corresponding to the PDSCHs in the PDSCH group, and start to store the ACK/NACK information corresponding to currently scheduled PDSCHs in the PDSCH group. At a slot n+t, if the base station indicates the information of new feedback indication (NFI) corresponding to the PDSCH group with the data channel group identifier as Group ID=1 meets NFI=1, the base station notifies the UE that all the previous ACK/NACK information corresponding to the PDSCH group with the data channel group identifier as Group ID=1 has been correctly received and can be discarded, and notifies the UE to feed back ACK/NACK information corresponding to currently scheduled PDSCHs.

In an exemplary embodiment, an order of ACK/NACK information, corresponding to each data channel group, in the fed-back HARQ-ACK codebook is determined group indexes corresponding to the currently scheduled data channels.

The technical solutions according to the present disclosure address the issues in PDSCH scheduling and triggering the HARQ-ACK codebook corresponding to a corresponding PDSCH group to perform feedback, provides multiple opportunities for transmission of HARQ-ACK codebook corresponding to each PDSCH, and improves system performance.

In the present disclosure, it is assumed that at time N, an HARQ-ACK codebook corresponding to one or more PDSCH groups is triggered through non-fallback DCI to perform feedback; and at time N+t, PDSCH is scheduled through a piece of fallback DCI. That is, the ACK/NACK information corresponding to the PDSCHs scheduled through the fallback DCI is fed back according to a preset method.

In one exemplary embodiment, the feeding back, according to a preset method, an HARQ-ACK codebook corresponding to a data channel group to which data channels scheduled through the fallback DCI belong, includes: determining the data channels scheduled through the fallback DCI through a timing relationship included in the fallback DCI; and feeding back the HARQ-ACK codebook corresponding to the data channel group to which the data channels scheduled through the fallback DCI belong.

In the present embodiments, the base station configures the dynamic codebook feedback of UEs through higher level signaling, and in this case, the PDSCH group can only be triggered through non-fallback DCI to perform feedback. For a method for feeding back an HARQ-ACK codebook corresponding to PDSCHs scheduled through the fallback DCI is described below.

It is assumed that at time N, the base station triggers an HARQ-ACK codebook corresponding to one or more PDSCH groups through non-fallback DCI to perform feedback; and at time N+t, the base station schedules a PDSCH through fallback DCI, and thus the ACK/NACK information corresponding to the PDSCH scheduled through the fallback DCI is fed back.

For each PDSCH scheduled through fallback DCI, the resource location required for the ACK/NACK information feedback is still determined through a timing relationship given in this fallback DCI.

The feedback mechanism by triggering the HARQ-ACK codebook of the PDSCH group according to dynamic information configured in a DCI is only applicable to non-fallback DCI, and only non-fallback DCI includes a corresponding bit field to trigger an HARQ-ACK codebook corresponding to one or more PDSCH groups to perform feedback. In a case where the DCI is fallback DCI, the UE performs HARQ-ACK codebook feedback for the scheduled PDSCHs according to a conventional feedback method of R15.

In one exemplary embodiment, the feeding back, according to a preset method, an HARQ-ACK codebook corresponding to a data channel group to which data channels scheduled through the fallback DCI belong, includes: triggering an HARQ-ACK codebook corresponding to a preset data channel group through received fallback DCI to perform feedback, where the data channels scheduled through the fallback DCI belong to a same preset data channel group; and, feeding back an HARQ-ACK codebook, which has not been fed back and is corresponding to a data channel group to which the data channels scheduled through the fallback DCI belong.

In the present embodiments, in order not only to add no new bit field to the fallback DCI, but also to support the triggering mechanism for HARQ-ACK codebook based on a PDSCH group, the following method may be used.

PDSCHs scheduled through fallback DCI are predefined to belong to a default special PDSCH group, for example, a PDSCH group with Group ID=0. In this case, if the base station sends fallback DCI to a UE, to indicate the UE to trigger the HARQ-ACK codebook of the PDSCH group with Group ID=0 to perform feedback, and the UE feeds back all the ACK/NACK information, which is corresponding to the PDSCH scheduled through the fallback DCI and has not been fed back, to the base station, and the time and frequency resources for performing feedback are determined according to the method described in R15.

According this method, the previous ACK/NACK feedback corresponding to the PDSCHs scheduled through the fallback DCI may have more opportunities to be transmitted, thereby improving reliability.

For PDSCHs scheduled through non-fallback DCIs but belonging to other groups, the HARQ-ACK codebook of one or more PDSCH groups is triggered to perform feedback in accordance with the methods according to the above embodiments.

In one exemplary embodiment, the feeding back, according to a preset method, an HARQ-ACK codebook corresponding to a data channel group to which data channels scheduled through the fallback DCI belong, includes: setting data channels scheduled through the fallback DCI to belong to a same preset data channel group; and triggering an HARQ-ACK codebook corresponding to the preset data channel group according to a received non-fallback DCI to perform feedback.

In an embodiment, a number of T-DAIs in the non-fallback DCI is accumulated, where the number of the T-DAIs includes a number of data channels of a preset data channel group scheduled through the non-fallback DCI and a number of data channels of the same preset data channel group scheduled through the fallback DCI, where NFI corresponding to the data channel group scheduled through the non-fallback DCI is not inverted.

In the present embodiments, the fallback DCI supports triggering the HARQ-ACK codebook of the PDSCH group to perform feedback, and PDSCHs scheduled through the fallback DCI and PDSCHs scheduled through the non-fallback DCI may be grouped in an unified manner, and no new bit field is added to the fallback DCI.

PDSCHs scheduled through the fallback DCI belong to a default PDSCH group, but the fallback DCI cannot trigger an HARQ-ACK codebook corresponding to this default PDSCH group to perform feedback, and for this default PDSCH group, HARQ-ACK codebook corresponding thereto can only be triggered through non-fallback DCI to perform feedback. For accumulating T-DAI corresponding to each PDSCH group in the non-fallback DCI, PDSCHs scheduled through the fallback DCI in a scheduling process should also be accumulated, and the NFI information corresponding to the group which the PDSCHs scheduled through the fallback DCI belong to cannot be inverted.

Figure 4:
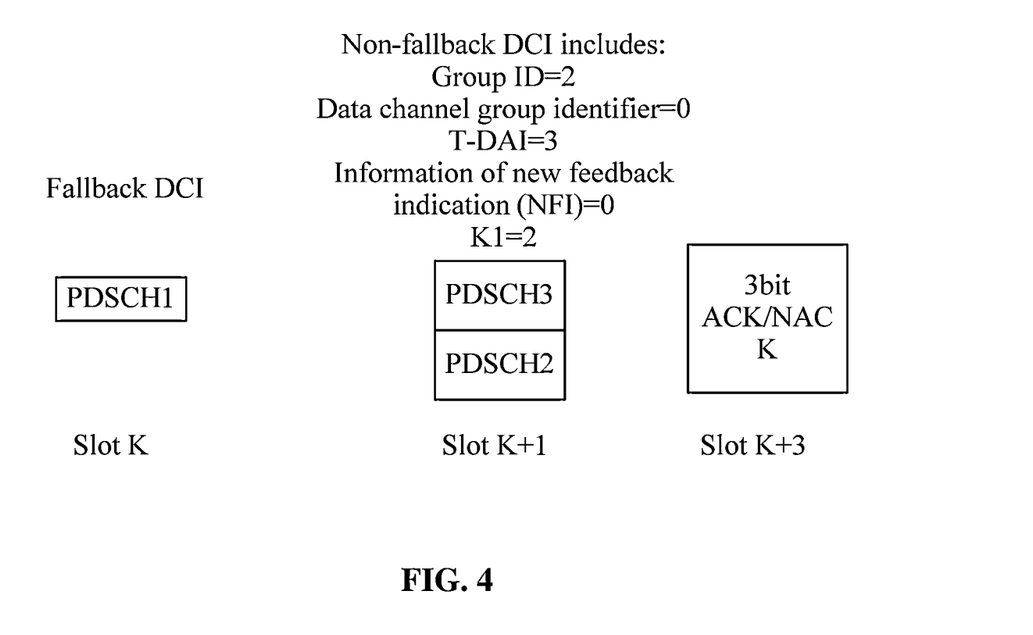
FIG. 4 is a schematic structural diagram of HARQ-ACK codebook feedback according to the present disclosure.

For example, FIG. 4 is a schematic structural diagram of HARQ-ACK codebook feedback according to the present disclosure. As shown in FIG. 4, there are two PDSCH groups in total, and all PDSCHs scheduled through the fallback DCI belong to the PDSCH group with the data channel group identifier as Group ID=2, or the PDSCHs scheduled through the fallback DCI are grouped according to the HARQ process into two groups, even-th processes belong to the PDSCH group with the data channel group identifier as Group ID=1, and odd-th HARQ processes belong to the PDSCH group with the data channel group identifier as Group ID=2. If in slot K, the base station schedules a PDSCH through fallback DCI, and in slot K+1, the base station schedules two PDSCHs through non-fallback DCI and indicates the two PDSCHs scheduled in slot K+1 belong to a same PDSCH group with the PDSCH scheduled in slot K, a corresponding T-DAI domain in the non-fallback DCI should be three, and the UE feeds back a three-bit HARQ-ACK codebook to the base station according to the feedback timing information in the time domain resource allocation indicated through the non-fallback DCI. The PDSCH group may also contain an HARQ-ACK codebook corresponding to other previously scheduled PDSCH whose feedback is not received by the base station or fails to be received by the base station.

In one exemplary embodiment, the feeding back, according to a preset method, an HARQ-ACK codebook corresponding to a data channel group to which data channels scheduled through the fallback DCI belong, includes: triggering, through the fallback DCI, an HARQ-ACK codebook corresponding to a preset data channel group to perform feedback, where the HARQ-ACK codebook includes an HARQ-ACK codebook corresponding to a first data channels scheduled through the fallback DCI and an HARQ-ACK codebook corresponding to a second data channel scheduled through the non-fallback DCI, and the first data channel and the second data channel belong to a same preset data channel group; and feeding back the HARQ-ACK codebook.

In an embodiment, after feeding back the HARQ-ACK codebook, the method further includes: accumulating a T-DAI corresponding to the preset data channel group on a previous T-DAI corresponding to the preset data channel group, where NFI corresponding to the preset data channel group is not inverted.

In the present embodiments, a method is described in which a content of fallback DCI is not modified, and an ACK/NACK codebook of a PDSCH scheduled through non-fallback DCI can be triggered to perform feedback through the fallback DCI.

The fallback DCI also supports triggering PDSCH group. A PDSCH scheduled through fallback DCI belongs to a predefined group, and the fallback DCI, when being sent, triggers ACK/NACK information corresponding to the PDSCH which is scheduled through non-fallback DCI and belongs to the predefined group, and the T-DAI should be accumulated on a previous and latest T-DAI corresponding to this predefined group, and information of new feedback indication (NFI) is not inverted by default.

For example, assuming that in a system, all PDSCHs scheduled through fallback DCI belong to the PDSCH group with a data signal indication Group ID=1, and two PDSCH groups are supported. At time n, the base station schedules the PDSCH group with the data signal indication Group ID=1 to perform ACK/NACK feedback through non-fallback DCI, and the value of T-DAI is four, in this case, the UE performs LBT unsuccessfully or does not receive ACK/NACK information from the base station correctly before feeding back the four-bit codebook, and meanwhile, at time k, the base station schedules a PDSCH through the fallback DCI, the fallback DCI can trigger the HARQ-ACK codebook of the PDSCH group with the data signal indication Group ID=1 to perform feedback, and indicates the UE that the value of C-DAI is five. After receiving the fallback DCI and performing LBT successfully, the UE feeds back four-bit information for the non-fallback DCI scheduling PDSCH group with the data signal identifier as Group ID=1 and one-bit information corresponding to the PDSCH scheduled through this fallback DCI, which are five-bit information in total, to the base station.

The opportunities for ACK/NACK feedback transmission is increased according to the present methods.

In an exemplary embodiment, the feeding back, according to a preset method, an HARQ-ACK codebook corresponding to a data channel group to which data channels scheduled through the fallback DCI belong, includes: triggering, through fallback DCI including NFI, an HARQ-ACK codebook corresponding to the data channel group to perform feedback; in a case where the NFI included in the fallback DCI is inverted, feeding back an HARQ-ACK codebook corresponding to a data channel currently scheduled through the fallback DCI including the NFI; and in a case where the NFI included in the fallback DCI is not inverted, feeding back an HARQ-ACK codebook corresponding to each data channel included in the data channel group pre-stored in the triggered data channel group and the HARQ-ACK codebook corresponding to the currently scheduled data channels.

In the present embodiments, another method for triggering an HARQ-ACK codebook of a PDSCH group through fallback DCI to perform feedback is described.

Some new bit fields are added to the fallback DCI or reserved bits are used to indicate some information. However, the number of newly added bit fields in the fallback DCI is less than the number of added bit fields in the non-fallback DCI.

For example, only one bit of information of new feedback indication (NFI) is added to the fallback DCI.

In a case where PDSCHs are scheduled through fallback DCI, the group triggered is default as a predefined group, for example, the PDSCH group with the data signal indication Group ID=1, and an HARQ-ACK codebook corresponding to all the PDSCHs in the group triggered are triggered to perform feedback. In addition, in a case where only one-bit NFI information is included in the fallback DCI, and information of NFI is inverted, the ACK/NACK information corresponding to the PDSCH(s) scheduled through the fallback DCI since currently is fed back. In a case where only one-bit NFI information is included in the fallback DCI, and information of NFI is not inverted, the ACK/NACK information corresponding to the PDSCHs including the PDSCH(s) scheduled previously is fed back. The UEs determine the number of bits of ACK/NACK to be fed back based on the value of the C-DAI.

In an embodiment, the triggering feedback also includes triggering ACK/NACK information corresponding to a PDSCH group scheduled through the non-fallback DCI and belonging to the PDSCH group with the data signal identifier as Group ID=1 to perform feedback.

In one exemplary embodiment, the feeding back, according to a preset method, an HARQ-ACK codebook corresponding to a data channel group to which data channels scheduled through the fallback DCI belong, includes: triggering a timer through a RRC signaling or a media access control control element (MAC CE) signaling; triggering, through fallback DCI including the data channel group identifier, an HARQ-ACK codebook corresponding to a data channel group corresponding to the data channel group identifier to perform feedback; and feeding back an HARQ-ACK codebook corresponding to the data channel group within a time period from a time point triggering the timer to a current time point.

In the present embodiments, another method of triggering an HARQ-ACK codebook corresponding to the PDSCH group through fallback DCI to perform feedback is described.

Only one data channel group identifier for triggering feedback is added to the fallback DCI, and the PDSCH group to which each PDSCH scheduled through the fallback DCI belong can be dynamically adjusted. After receiving the fallback DCI, the UE feeds back, according to the data channel group identifier for triggering feedback, an HARQ-ACK codebook corresponding to all PDSCHs in the PDSCH group with the data channel group identifier.

In an embodiment, a timer may be configured. The timer is triggered through RRC signaling or MAC-CE, and the HARQ-ACK codebook fed back by the UE each time is the HARQ-ACK codebook corresponding to all the PDSCH groups from a triggering of a previous timer to current time. When the base station receives the ACK/NACK information corresponding to the PDSCH group, the timer may be triggered again through RRC signaling or MAC-CE.

For example, the base station triggers the timer at time N through the MAC CE to start clocking, and sends fallback DCI to schedule a certain PDSCH at time N+T, and the fallback DCI includes a data channel group identifier as Group ID=1, which means triggering an HARQ-ACK codebook corresponding to all PDSCHs belonging to a PDSCH group with the data channel group identifier as Group ID=1 to perform feedback. The PDSCH groups with the data channel group identifier as Group ID=1 includes not only some PDSCHs scheduled through fallback DCI but also some PDSCHs scheduled through non-fallback DCI and belonging to the PDSCH group with the data channel group identifier as Group ID=1. After receiving the data channel group identifier, the UE feeds back all the ACK/NACK information corresponding to PDSCHs belonging to the PDSCH group with the data channel group identifier as Group ID=1 from a time of triggering a previous timer to a current time.

In an embodiment, PDSCHs scheduled through fallback DCI are accumulated in a unified manner, and a total number of all PDSCHs, corresponding to the PDSCH group scheduled through fallback DCI till a current time is indicated through C-DAI. PDSCHs, of the PDSCH group, scheduled through non-fallback DCI are accumulated within group through the T-DAI in a unified manner. A number of bits of the ACK/NACK information finally fed back by the UE is determined according to a sum of a last C-DAI and a last T-DAI.

Assuming that the base station schedules, through four pieces of fallback DCI, four PDSCHs. The four PDSCHs all belong to a PDSCH group with the data channel group identifier as Group ID=1, and correspond to a value of C-DAI in a last fallback DCI being four. The base station further schedules, through four non-fallback DCIs, six PDSCHs. The six PDSCHs also all belong to the PDSCH group with the data channel group identifier as Group ID=1, and is indicated through a value of a T-DAI in the last non-fallback DCI being six. Accordingly, the UE, after receiving these information, feeds back ten bits of the ACK/NACK information corresponding to the PDSCH group with the data channel group identifier as Group ID=1.

In one exemplary embodiment, the feeding back, according to a preset method, an HARQ-ACK codebook corresponding to a data channel group to which data channels scheduled through the fallback DCI belong, includes: triggering, through the fallback DCI, an HARQ-ACK codebook corresponding to the data channel group to perform feedback, where the data channel group includes data channels scheduled through the fallback DCI and data channels scheduled through the non-fallback DCI, and a data channel group to which the data channels scheduled through the fallback DCI belong is preset or semi-statically configured according to an HARQ process.

In the present embodiments, an indication method for triggering a UE through DCI, that schedules PUSCHs, to feed back an HARQ-ACK codebook corresponding to a certain PDSCH group is described.

In an embodiment, the PDSCH group includes not only PDSCHs scheduled through fallback DCI but also PDSCHs scheduled through non-fallback DCI. The group to which PDSCHs scheduled through the fallback DCI belong is default, or is semi-statically configured according to the HARQ process.

For example, two PDSCH groups are semi-statically configured through higher level signaling or predefined, and two-bit bitmap are added to the fallback DCI to indicate whether to trigger an HARQ-ACK codebook corresponding to the two groups to perform feedback. For example, when the bitmap is 10, it indicates triggering the first group to perform feedback; when the bitmap is 01, it indicates triggering the second group to perform feedback, and when the bitmap is 11, it indicates triggering the two groups to perform HARQ-ACK feedback. Alternatively, only one-bit may be defined, and when it is defined as 0, it represents triggering the PDSCH group to which the currently scheduled PDSCHs belongs to perform feedback, and when it is defined as 1, it represents not only triggering an HARQ-ACK codebook corresponding to a group to which the currently scheduled PDSCHs belongs to perform feedback, but also triggering an HARQ-ACK codebook corresponding to remaining group(s) to perform feedback, or, triggering an HARQ-ACK codebook corresponding to all PDSCH groups to perform feedback. After receiving the information, the UE multiplexes the HARQ-ACK codebook information of two groups or one group to the scheduled PUSCHs to upload to the base station.

In one exemplary embodiment, the feeding back, according to a preset method, an HARQ-ACK codebook corresponding to a data channel group to which data channels scheduled through the fallback DCI belong, includes: triggering, through DCI corresponding to an uplink grant (UL grant), an HARQ-ACK codebook corresponding to a data channel group corresponding to a downlink HARQ process to perform feedback.

In an embodiment, the triggering, through the DCI corresponding to the UL grant, an HARQ-ACK codebook corresponding to the data channel group corresponding to the downlink HARQ process to perform feedback includes: triggering, through the DCI corresponding to the UL grant, in a case where bit information included in the DCI corresponding to the UL grant is enabled, an HARQ-ACK codebook corresponding to the data channel group corresponding to the downlink HARQ process to perform feedback.

The triggering through the DCI corresponding to the UL grant the ACK/NACK feedback corresponding to the PDSCHs corresponding to all the configured downlink HARQ processes, specifically includes: adding one bit information to the DCI corresponding to the UL grant including fallback DCI and non-fallback DCI, and when the one-bit is enabled, the UE is triggered to feed back ACK/NACK information corresponding to the PDSCHs of all the configured downlink HARQ processes. If the one bit field is not enabled, the mechanism is not triggered, and the DCI is used to schedule PUSCH transmission as conventional.

In one exemplary embodiment, the method further includes: feeding back the HARQ-ACK codebook by carrying the HARQ-ACK codebook in group common downlink control information (GC-DCI), where the HARQ-ACK codebook is scrambled through a radio network temporary identifier (RNTI), and a time-frequency resource position where the HARQ-ACK codebook is located is transmitted through a broadcast channel and/or a remaining minimum system information (RMSI) channel.

The HARQ-ACK information fed back simultaneously by the base station to multiple UEs is carried in one GC-DCI.

The downlink feedback information is scrambled by a specific RNTI, the time-frequency resource position is configured, and notified to multiple UEs through a broadcast channel.

In one exemplary embodiment, the CI further includes at least one of a modulation and coding scheme (MCS), and a transmit precoder matrix indicator (TPMI).

For the GC-DCI, in addition to the above information, the GC-DCI further includes some indication information such as MCS, TPMI, for scheduling and triggering channels to adaptively retransmit.

In one exemplary embodiment, when performing HARQ-ACK codebook feedback, the method includes acquiring an HARQ-ACK codebook corresponding to uplink data sent by a user equipment UE.

In one exemplary embodiment, bit positions of the HARQ-ACK codebook corresponding to the uplink data are determined according to one of:

a one to one correspondence between the bit positions of the HARQ-ACK codebook and resource positions or resource group positions of corresponding uplink data channels; and a one to one correspondence between the bit positions of the HARQ-ACK codebook and control channel element (CCE) indexes corresponding to the scheduled data channels.

The bit positions of the HARQ-ACK information and one resource position or one resource group position of PUSCH(s) corresponding to each UE are in one to one correspondence. Depending on the position of the uplink data transmitted by the UEs being different, the bit positions of the HARQ-ACK information fed back by the base station are also different.

For example, a first bit corresponds to PRB0, a second bit corresponds to PRB1, and so on. Or the first bit corresponds to RBG0, the second bit corresponds to RBG1, and so on.

In a case where one resource group corresponds to multiple users, HARQ-ACK corresponds to multiple users may be bundled or may be multiplexed. That is, when HARQ-ACK corresponding to one user is 0, bundled or multiplexed HARQ-ACK is 0, and only when HARQ-ACK corresponds to all the multiple users are 1, bundled or multiplexed HARQ-ACK is 1.

The one-to-one correspondence is performed according to the minimum CCE index of the DCI corresponding to the PUSCHs scheduled.

For example, if the minimum CCE index of the scheduling DCI corresponding to the PUSCH of the UE1 is 1, the minimum CCE index of the scheduling DCI corresponding to the PUSCH of the UE2 is 2, and the minimum CCE index of the scheduling DCI corresponding to the PUSCH of the UE3 is 3, the base station simultaneously feeds back the ACK/NACK to the three UEs in a sequence order of the CCE indexes, and the three UEs receive the ACK/NACK according to the sequence order.

In an exemplary embodiment, the method mentioned above for triggering the UE by a base station through DCI to perform HARQ codebook feedback on one PDSCH group applied to method for triggering uplink PUSCH group by the base station to perform ACK/NACK feedback is described.

First, the HARQ processes configured by the UE are predefined to be grouped. For example, grouping even-th HARQ processes into a group with a group identifier as 1, and grouping odd-th HARQ processes into a group with a group identifier as 2. The base station informs the UE through a two-bit group triggering indication in the DCI corresponding to the UL grant that ACK/NACK information corresponding to which PUSCH group is to be fed back. Accordingly, the UE receives the ACK/NACK fed back by the base station and retransmits the corresponding data, according to the two-bit group triggering indication.

In an embodiment, the PUSCH includes a PUSCH autonomously transmitted by a UE and a PUSCH scheduled by a base station.

The method can also provide multiple transmission opportunities for the ACK/NACK feedback corresponding to the uplink PUSCH to improve feedback robustness.

Figure 5:
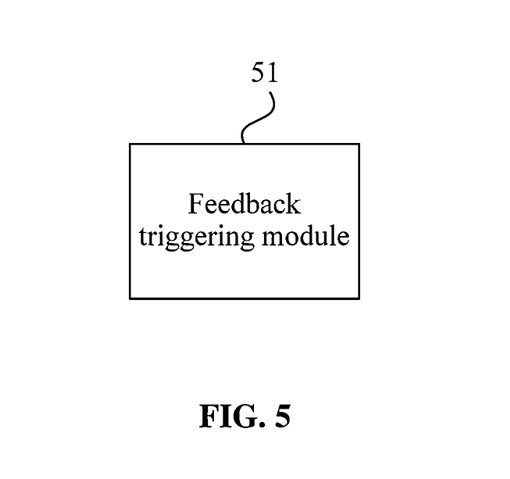
FIG. 5 is a schematic structural diagram of a codebook feedback apparatus according to the present disclosure.

A codebook feedback apparatus is further provided according to embodiments of the present disclosure. FIG. 5 is a schematic structural diagram of a codebook feedback apparatus according to the present disclosure. This method is suitable for a case where HARQ-ACK codebook feedback is performed when the NR uses unlicensed carriers. The codebook feedback apparatus may be implemented by software and/or hardware and integrated on a base station. As shown in FIG. 5, the codebook feedback apparatus mainly includes a feedback triggering module 51.

The feedback triggering module 51 is configured to trigger a hybrid automatic repeat request-acknowledgement (HARQ-ACK) codebook of a data channel group to perform feedback according to control information (CI), and the CI includes at least one of: information of new feedback indication (NFI) corresponding to one or more data channel groups, a data channel group identifier and a group index corresponding to a currently scheduled data channel, or, a total downlink assignment index (T-DAI) corresponding to one or more data channel groups.

The codebook feedback apparatus according to the present embodiments is applied to the codebook feedback method according to the embodiments of the present disclosure. The implementation principles and technical effects of the codebook feedback apparatus according to the present embodiments are similar to those of the codebook feedback method according to the embodiments of the present disclosure, and are not repeated herein.

In one exemplary embodiment, the CI is downlink control information DCI, and the DCI includes fallback DCI and non-fallback DCI.

In one exemplary embodiment, the HARQ-ACK codebook includes at least one of: an HARQ-ACK codebook of a currently scheduled data channel group, an HARQ-ACK codebook of a data channel group scheduled before a current time point, an HARQ-ACK codebook of a data channel group first triggered, an HARQ-ACK codebook of a data channel group re-triggered, an HARQ-ACK codebook of a data channel group autonomously transmitted, or an HARQ-ACK codebook of a data channel group semi-continuously scheduled.

In one exemplary embodiment, the feedback triggering module 51 is configured to trigger an HARQ-ACK codebook corresponding to one or more data channel groups through the non-fallback DCI to perform feedback; and feed back, according to a preset method, an HARQ-ACK codebook corresponding to a data channel group to which data channels scheduled through the fallback DCI belong.

In one exemplary embodiment, the feedback triggering module 51 is configured to determine the HARQ-ACK codebook according to the data channel group identifier and information of new feedback indication corresponding to one or more data channel groups; and feeding back the HARQ-ACK codebook.

In one exemplary embodiment, the feedback triggering module 51 is configured to determine a data channel group triggered for feedback according to the data channel group identifier; in a case where the information of new feedback indication corresponding to the data channel group is not inverted, determine corresponding ACK/NACK information pre-stored in the data channel group to which the scheduled data channel belongs and ACK/NACK information corresponding to the currently scheduled data channels as the HARQ-ACK codebook; and in a case where the NFI corresponding to the scheduled data channel group is inverted, determine to discard the corresponding ACK/NACK information pre-stored in the data channel group to which the scheduled data channel belongs, and determine the ACK/NACK information corresponding to the currently scheduled data channels as the HARQ-ACK codebook.

In one exemplary embodiment, the feedback triggering module 51 is configured to determine an order of ACK/NACK information corresponding to each data channel group in the fed-back HARQ-ACK codebook according to group indexes corresponding to the currently scheduled data channels.

In one exemplary embodiment, the feedback triggering module 51 is configured to determine the data channels scheduled through the fallback DCI through a timing relationship included in the fallback DCI, and feedback the HARQ-ACK codebook corresponding to the data channel group to which the data channels scheduled through the fallback DCI belong.

In one exemplary embodiment, the feedback triggering module 51 is configured to trigger, according to received fallback DCI, an HARQ-ACK codebook corresponding to a preset data channel group to perform feedback, where the data channels scheduled through the fallback DCI belong to a same preset data channel group; and feedback an HARQ-ACK codebook which has not been fed back and is corresponding to a data channel group to which the data channels scheduled through the fallback DCI belong.

In one exemplary embodiment, the feedback triggering module 51 is configured to set the data channels scheduled through the fallback DCI to belong to a same preset data channel group, and trigger, according to received non-fallback DCI, an HARQ-ACK codebook corresponding to the same preset data channel group to perform feedback.

In one exemplary embodiment, the feedback triggering module 51 is configured to accumulate a number of T-DAIs in the non-fallback DCI, where the number of the T-DAIs includes a number of data channels of a preset data channel group scheduled through the non-fallback DCI and a number of data channels of the same preset data channel group scheduled through the fallback DCI, and NFI corresponding to the data channel group scheduled through the non-fallback DCI is not inverted.

In one exemplary embodiment, the feedback triggering module 51 is configured to trigger, through the fallback DCI, an HARQ-ACK codebook corresponding to a preset data channel group to perform feedback, where the HARQ-ACK codebook includes an HARQ-ACK codebook corresponding to a first data channels scheduled through the fallback DCI and an HARQ-ACK codebook corresponding to a second data channel scheduled through the non-fallback DCI, and the first data channel and the second data channel belong to a same preset data channel group; and feedback the HARQ-ACK codebook.

In one exemplary embodiment, the feedback triggering module 51 is configured to accumulate a T-DAI corresponding to the preset data channel group on a previous T-DAI corresponding to the preset data channel group, where NFI corresponding to the preset data channel group is not inverted.

In one exemplary embodiment, the feedback triggering module 51 is configured to trigger, through fallback DCI including NFI, an HARQ-ACK codebook corresponding to the data channel group to perform feedback; in a case where the NFI is inverted, feeding back an HARQ-ACK codebook corresponding to a data channel currently scheduled through the fallback DCI including the NFI; and in a case where the NFI is not inverted, feeding back an HARQ-ACK codebook corresponding to each data channel included in the data channel group pre-stored in the triggered data channel group and the HARQ-ACK codebook corresponding to the currently scheduled data channels.

In one exemplary embodiment, the feedback triggering module 51 is configured to trigger a timer through RRC signaling or MAC CE signaling; trigger, through fallback DCI including the data channel group identifier, an HARQ-ACK codebook corresponding to a data channel group corresponding to the data channel group identifier to perform feedback; and perform feedback on an HARQ-ACK codebook corresponding to the data channel group within a time period from a time point triggering the timer to a current time point.

In one exemplary embodiment, a feedback triggering module 51 is configured to trigger, through the fallback DCI, an HARQ-ACK codebook corresponding to the data channel group to perform feedback, where the data channel group includes data channels scheduled through the fallback DCI and data channels scheduled through the non-fallback DCI, and a data channel group to which the data channels scheduled through the fallback DCI belong is preset or semi-statically configured according to an HARQ process.

In one exemplary embodiment, the feedback triggering module 51 is configured to trigger, through DCI corresponding to an uplink grant (UL grant), an HARQ-ACK codebook corresponding to a data channel group corresponding to a downlink HARQ process to perform feedback.

In one exemplary embodiment, in a case where bit information included in the DCI corresponding to the UL grant is enabled, the DCI corresponding to the uplink grant (UL grant) trigger an HARQ-ACK codebook corresponding to the data channel group corresponding to the downlink HARQ process to perform feedback.

In one exemplary embodiment, the data channel includes a physical uplink shared channel PUSCH and a physical downlink shared channel PDSCH.

In one exemplary embodiment, the feedback triggering module 51 is configured to feed back the HARQ-ACK codebook by carrying the HARQ-ACK codebook in the group common downlink control information (GC-DCI), where the HARQ-ACK codebook is scrambled through a RNTI, and a time-frequency resource position of the HARQ-ACK codebook is transmitted through a broadcast channel and/or a RMSI channel.

In one exemplary embodiment, the CI further includes at least one of: a modulation and coding scheme (MCS), or, a transmit precoder matrix indicator (TPMI).

In one exemplary embodiment, the feedback triggering module 51 is configured to acquire, when performing HARQ-ACK codebook feedback, an HARQ-ACK codebook corresponding to an uplink data channel transmitted by a user equipment (UE).

In one exemplary embodiment, bit positions of the HARQ-ACK codebook corresponding to the uplink data is determined according to one of:

a one to one correspondence between the bit positions of the HARQ-ACK codebook and resource positions of corresponding data channels or resource group positions of corresponding data channels; or a one to one correspondence between the bit positions of the HARQ-ACK codebook and CCE indexes corresponding to the scheduled data channels.

Figure 6:
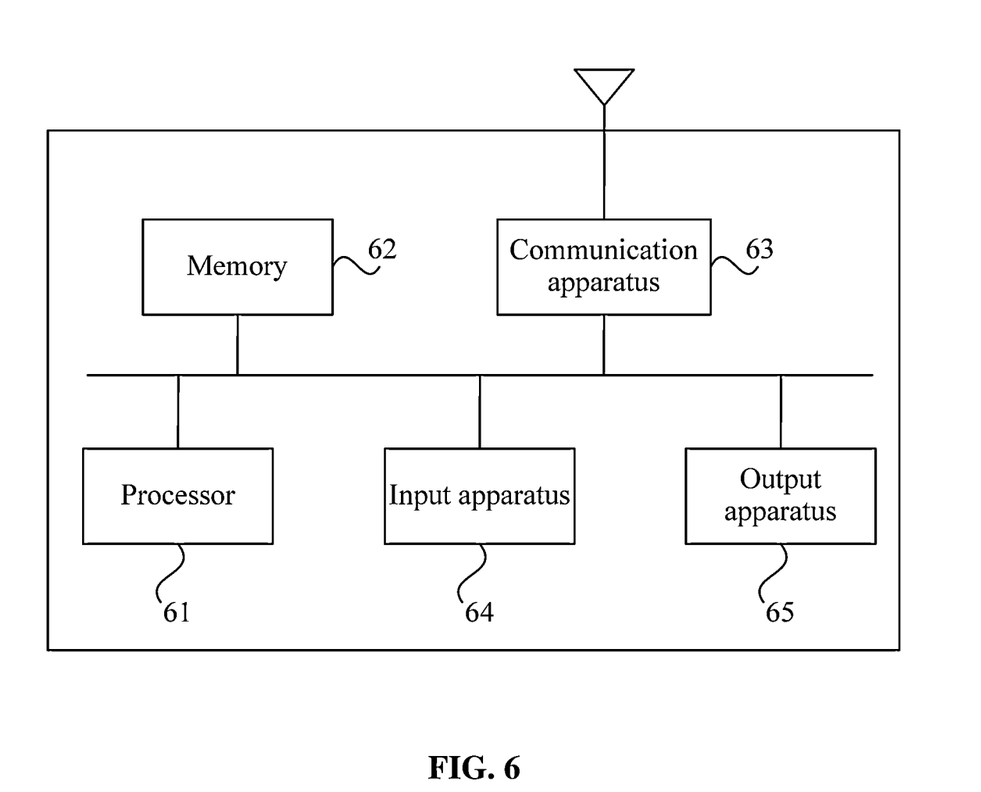
FIG. 6 is a schematic structural diagram of a user equipment according to the present disclosure.

A user equipment is further provided according to embodiments of the present disclosure. FIG. 6 is a schematic structural diagram of a user equipment according to the present disclosure. As shown in FIG. 6, the user equipment according to the present disclosure includes one or more processes 61 and a memory 62. The user equipment may include one or more The processors 61, and one processor 61 included is taken as an example in FIG. 6. The memory 62 is configured to store one or more programs. The one or more programs are executed by the one or more processors 61, to cause the one or more processors 61 to implement the codebook feedback method as described in the embodiments of the present disclosure.

The user equipment further includes a communication apparatus 63, an input apparatus 64, and an output apparatus 65.

The processor(s) 61, the memory 62, the communication apparatus 63, the input apparatus 64, and the output apparatus 65 in the user equipment may be connected via a bus or other means, and in FIG. 6, a connection via a bus is taken as an example.

The input apparatus 64 may be configured to receive input numeric or character information and to generate input of key-pressing signal related to user settings of the user equipment and functional control of the user equipment. The output apparatus 65 may include a display device such as a display screen.

The communication apparatus 63 may include a receiver and a transmitter. The communication apparatus 63 is configured to perform information transmission/reception communication under the control of the processor 61.

As a computer-readable storage medium, the memory 62 may be configured to store a software program, a computer-executable program and a module, such as the program instructions/module corresponding to the codebook feedback method in the embodiments of the present disclosure (e.g., the feedback triggering module 51 in the codebook feedback apparatus). The memory 62 may include a program storage area and a data storage area, where the program storage area may store an operating system and at least one application program required by functions, the data storage area may store data created during a utilization of the device, and etc. Further, the memory 62 may include a high-speed random access memory, and may further include a non-volatile memory, such as at least one magnetic disk storage apparatus, a flash memory device, or other non-volatile solid-state storage apparatus. In some examples, the memory 62 may include memories which are remotely provided with respect to the processor(s) 61, and these remote memories may be connected to the user equipment through a network. Examples of the aforementioned network include, but are not limited to, the Internet, an intranet, a local area network, a mobile communication network, or any combination thereof.

A storage medium is further provided according to embodiments of the present disclosure, which stores a computer program. The computer program, when being executed by the processor, implements the codebook feedback method according to any one of the embodiments of the present disclosure, and the method includes:

triggering, according to control information (CI), a hybrid automatic repeat request-acknowledgement (HARQ-ACK) codebook of a data channel group to perform feedback, where the CI includes at least one of: information of new feedback indication (NFI) corresponding to one or more data channel groups, an identifier of a data channel group triggered for feedback and a group index corresponding to a currently scheduled data channel, or, a total downlink assignment index (T-DAI) corresponding to one or more data channel groups.

The above are only exemplary embodiments of the present disclosure, which are not intended to limit the scope of the present disclosure.

It is to be understood by the person skilled in the art that the term "user terminal" encompasses any appropriate type of radio user device, such as a mobile phone, a portable data processing apparatus, a portable web browser, or a vehicle-mounted mobile station.

In general, the various embodiments of the present disclosure may be implemented in hardware or a dedicated circuit, software, logic, or any combination thereof. For example, some aspects of the various embodiments may be implemented in hardware, while other aspects of the various embodiments may be implemented in firmware or software that may be executed by a controller, a microprocessor, or other computing apparatuses, and the present disclosure is not limited thereto.

Embodiments of the present disclosure may be implemented by a data processor of a mobile apparatus executing computer program instructions, for example, the embodiments of the present disclosure may be implemented in a processor entity, by hardware, or by a combination of software and hardware. The computer program instructions may be assembly instructions, instruction set architecture (ISA) instructions, machine instructions, machine-related instructions, micro-codes, firmware instructions, state setting data, or source codes or object codes written in any combination of one or more programming languages.

The block diagrams of any logic flow in drawings of the present disclosure may represent program steps, or may represent interconnected logic circuits, modules, and functions, or may represent a combination of program steps, logic circuits, modules, and functions. The computer programs may be stored in a memory. The memory may be of any type suitable for a local technical environment and may be implemented using any suitable data storage technology, such as, but not limited to, a read-only memory (ROM), a random-access memory (RAM) and an optical memory apparatus and system (digital video disc (DVD) or compact disc (CD)). The computer-readable storage medium may include a non-transitory storage medium. The data processor may be of any type appropriate for the local technical environment such as, but not limited to, a general-purpose computer, a special purpose computer, a microprocessor, a digital signal processor (DSP), an application specific integrated circuit (ASIC), a field-programmable gate array (FPGA), or a processor based on a multi-core processor architecture.

What is claimed is:

1. A codebook feedback method comprising:
   sending, by a base station, control information (CI) to a user equipment (UE), wherein the CI is used for triggering the UE to feed back a hybrid automatic repeat request-acknowledgement (HARQ-ACK) codebook corresponding to a data channel group, and wherein the CI comprises: information of new feedback indication (NFI) corresponding to one or more data channel groups, a data channel group identifier and a group index corresponding to a currently scheduled data channel, and, a total downlink assignment index (T-DAI) corresponding to one or more data channel groups,
   wherein the information of NFI is used to indicate whether the one or more data channel groups comprises a currently scheduled data channel group only or the one or more data channel groups comprises comprise a currently scheduled data channel group and one or more previously scheduled data channel groups;
   the data channel group identifier is used to indicate a data channel group to which currently scheduled data channels belong, and the group index corresponding to the currently scheduled data channel is used to indicate to feed back only a HARQ-ACK codebook corresponding to the data channel group to which the currently scheduled data channels belong, or, to feed back HARQ-ACK codebooks corresponding to all data channel groups; and
   the T-DAI is used to indicate that the one or more data channel groups are not scheduled currently but an HARQ-ACK codebook corresponding to the one or more data channel groups is to be fed back.

2. The method according to claim 1, wherein the CI is downlink control information (DCI), wherein the DCI comprises fallback DCI and non-fallback DCI.

3. The method according to claim 1, wherein the HARQ-ACK codebook comprises at least one of: an HARQ-ACK codebook corresponding to a currently scheduled data channel group, an HARQ-ACK codebook corresponding to a data channel group scheduled before a current time point, an HARQ-ACK codebook corresponding to a data channel group first triggered, an HARQ-ACK codebook corresponding to a data channel group re-triggered, an HARQ-ACK codebook corresponding to a data channel group autonomously transmitted, or, an HARQ-ACK codebook corresponding to a data channel group semi-continuously scheduled.

4. A non-transitory computer-readable storage medium storing a computer program, wherein the computer program, when executed by a processor, implements the codebook feedback method according to claim 1.

5. A base station, comprising:
   one or more processors;
   a memory, configured to store one or more programs;
   wherein the one or more programs are executed by the one or more processors, to cause the one or more processors to perform the codebook feedback method according to claim 1.

6. A user equipment, comprising:
   one or more processors;
   a memory, configured to store one or more programs;
   wherein the one or more programs are executed by the one or more processors, to cause the one or more processors to perform the following:
   receiving control information (CI) from a base station; and,
   feeding back a HARQ-ACK codebook corresponding to a data channel group according to the CI, wherein the CI comprises: information of new feedback indication (NFI) corresponding to one or more data channel groups, a data channel group identifier and a group index corresponding to a currently scheduled data channel, and, a total downlink assignment index (T-DAI) corresponding to one or more data channel groups; and
   wherein the information of NFI is used to indicate whether the one or more data channel groups comprises a currently scheduled data channel group only or the one or more data channel groups comprises comprise a currently scheduled data channel group and one or more previously scheduled data channel groups;
   the data channel group identifier is used to indicate a data channel group to which currently scheduled data channels belong, and the group index corresponding to the currently scheduled data channel is used to indicate to feed back only a HARQ-ACK codebook corresponding to the data channel group to which the currently scheduled data channels belong, or, to feed back HARQ-ACK codebooks corresponding to all data channel groups; and
   the T-DAI is used to indicate that the one or more data channel groups are not scheduled currently but an HARQ-ACK codebook corresponding to the one or more data channel groups is to be fed back.

7. A codebook feedback method comprising:
receiving, by a user equipment (UE), control information (CI) from a base station; and,
feeding back, by the UE, a HARQ-ACK codebook corresponding to a data channel group according to the CI, wherein the CI comprises: information of new feedback indication (NFI) corresponding to one or more data channel groups, a data channel group identifier and a group index corresponding to a currently scheduled data channel, and, a total downlink assignment index (T-DAI) corresponding to one or more data channel groups; and
wherein the information of NFI is used to indicate whether the one or more data channel groups comprises a currently scheduled data channel group only or the one or more data channel groups comprises comprise a currently scheduled data channel group and one or more previously scheduled data channel groups;
the data channel group identifier is used to indicate a data channel group to which currently scheduled data channels belong, and the group index corresponding to the currently scheduled data channel is used to indicate to feed back only a HARQ-ACK codebook corresponding to the data channel group to which the currently scheduled data channels belong, or, to feed back HARQ-ACK codebooks corresponding to all data channel groups; and
the T-DAI is used to indicate that the one or more data channel groups are not scheduled currently but an HARQ-ACK codebook corresponding to the one or more data channel groups is to be fed back.

8. The method according to claim 7, wherein the CI is downlink control information (DCI), wherein the DCI comprises fallback DCI and non-fallback DCI.

9. The method according to claim 8, wherein the feeding back, by the UE, an HARQ-ACK codebook corresponding to a data channel group according to the CI comprises:
determining, by the UE, through the non-fallback DCI, an HARQ-ACK codebook corresponding to one or more data channel groups, wherein the HARQ-ACK codebook corresponding to the one or more data channel groups is to be fed back; and
feeding back, by the UE, according to a preset method, an HARQ-ACK codebook corresponding to a data channel group to which data channels scheduled through the fallback DCI belong.

10. The method according to claim 9, wherein the determining, by the UE, through the non-fallback DCI, an HARQ-ACK codebook corresponding to one or more data channel groups comprises:
determining, by the UE, the HARQ-ACK codebook according to the data channel group identifier and the information of new feedback indication corresponding to one or more data channel groups; and
feeding back, by the UE, the HARQ-ACK codebook.

11. The method according to claim 10, wherein the determining, by the UE, the HARQ-ACK codebook according to the data channel group identifier and the information of new feedback indication corresponding to one or more data channel groups comprises:
determining, by the UE, a data channel group according to the data channel group identifier, wherein an HARQ-ACK codebook corresponding to the data channel group is to be fed back;
in a case where the NFI corresponding to the data channel group is not inverted, determining, by the UE, ACK/NACK information pre-stored in the data channel group to which the currently scheduled data channels belong and ACK/NACK information corresponding to the currently scheduled data channels as the HARQ-ACK codebook; and
in a case where the NFI corresponding to the data channel group is inverted, discarding, by the UE, the ACK/NACK information pre-stored in the data channel group to which the currently scheduled data channels belong, and determining the ACK/NACK information corresponding to the currently scheduled data channels as the HARQ-ACK codebook;
wherein the determining, by the UE, ACK/NACK information pre-stored in the data channel group to which the currently scheduled data channels belong and ACK/NACK information corresponding to the currently scheduled data channels as the HARQ-ACK codebook, comprises:
determining, by the UE, an order of ACK/NACK information corresponding to each data channel group in the HARQ-ACK codebook corresponding to the data channel group, according to group indexes corresponding to the currently scheduled data channels.

12. The method according to claim 9, wherein the feeding back, by the UE, according to a preset method, an HARQ-ACK codebook corresponding to a data channel group to which data channels scheduled through the fallback DCI belong, comprises:
determining, by the UE, the data channels scheduled through the fallback DCI through a timing relationship comprised in the fallback DCI; and
feeding back, by the UE, the HARQ-ACK codebook corresponding to the data channel group to which the data channels scheduled through the fallback DCI belong;
or,
wherein the feeding back, by the UE, according to a preset method, an HARQ-ACK codebook corresponding to a data channel group to which data channels scheduled through the fallback DCI belong comprises:
determining, by the UE, an HARQ-ACK codebook corresponding to a preset data channel group through the fallback DCI, wherein the HARQ-ACK codebook corresponding to the preset data channel group is to be fed back, and wherein the data channels scheduled through the fallback DCI belong to a same preset data channel group; and
feeding back an HARQ-ACK codebook which has not been fed back and is corresponding to a data channel group to which the data channels scheduled through the fallback DCI belong;
or,
wherein the feeding back, by the UE, according to a preset method, an HARQ-ACK codebook corresponding to a data channel group to which data channels scheduled through the fallback DCI belong comprises:
setting, by the UE, data channels scheduled through fallback DCI to belong to a same preset data channel group; and
determining, by the UE, an HARQ-ACK codebook corresponding to the same preset data channel group through the non-fallback DCI, wherein the HARQ-ACK codebook corresponding to the same preset data channel group is to be fed back.

13. The method according to claim 12, wherein the determining, by the UE, HARQ-ACK codebook corresponding to the same preset data channel group through the non-fallback DCI further comprises:
accumulating, by the UE, a number of T-DAIs in the non-fallback DCI, wherein the number of the T-DAIs comprises a number of data channels of a preset data channel group scheduled through the non-fallback DCI and a number of data channels of the same preset data channel group scheduled through the fallback DCI, and wherein NFI corresponding to the data channel group scheduled through the non-fallback DCI is not inverted.

14. The method according to claim 9, wherein the feeding back, by the UE, according to a preset method, an HARQ-ACK codebook corresponding to a data channel group to which data channels scheduled through the fallback DCI belong comprises:
determining, by the UE, through the fallback DCI, an HARQ-ACK codebook corresponding to a preset data channel group, wherein the HARQ-ACK codebook corresponding to the preset data channel group is to be fed back, and wherein the HARQ-ACK codebook comprises an HARQ-ACK codebook corresponding to a first data channel scheduled through the fallback DCI and an HARQ-ACK codebook corresponding to a second data channel scheduled through the non-fallback DCI, and the first data channel and the second data channel belong to a same preset data channel group; and
feeding back, by the UE, the HARQ-ACK codebook;
wherein after the feeding back the HARQ-ACK codebook by the UE, the method further comprises:
accumulating, by the UE, a T-DAI corresponding to the preset data channel group on a previous T-DAI corresponding to the preset data channel group, wherein NFI corresponding to the preset data channel group is not inverted.

15. The method according to claim 9, wherein the feeding back, by the UE, according to a preset method, an HARQ-ACK codebook corresponding to a data channel group to which data channels scheduled through the fallback DCI belong, comprises:
determining, by the UE, through fallback DCI comprising NFI, an HARQ-ACK codebook corresponding to the data channel group, wherein the HARQ-ACK codebook corresponding to the data channel group is to be fed back;
in a case where the NFI is inverted, feeding back, by the UE, an HARQ-ACK codebook corresponding to a data channel currently scheduled through the fallback DCI comprising the NFI; and
in a case where the NFI is not inverted, feeding back, by the UE, an HARQ-ACK codebook corresponding to each data channel comprised in a pre-stored data channel group in the triggered data channel group and the HARQ-ACK codebook corresponding to the currently scheduled data channels;
or,
wherein the feeding back, by the UE, according to a preset method, an HARQ-ACK codebook corresponding to a data channel group to which data channels scheduled through the fallback DCI belong, comprises:
determining, by the UE, a timer through a radio resource control (RRC) signaling or a media access control control element (MAC CE) signaling;
determining, by the UE, through fallback DCI comprising the data channel group identifier, an HARQ-ACK codebook corresponding to a data channel group corresponding to the data channel group identifier, wherein the HARQ-ACK codebook corresponding to the data channel group corresponding to the data channel group identifier is to be fed back; and
feeding back, by the UE, an HARQ-ACK codebook corresponding to the data channel group to which the data channels scheduled through the fallback DCI belong within a time period from a time point triggering the timer to a current time point;
or,
wherein the feeding back, by the UE, according to a preset method, an HARQ-ACK codebook corresponding to a data channel group to which data channels scheduled through the fallback DCI belong, comprises:
determining, by the UE, through the fallback DCI, an HARQ-ACK codebook corresponding to the data channel group, wherein the HARQ-ACK codebook corresponding to the data channel group is to be fed back, wherein the data channel group comprises data channels scheduled through the fallback DCI and data channels scheduled through the non-fallback DCI, and a data channel group to which the data channels scheduled through the fallback DCI belong is preset or semi-statically configured according to a HARQ process;
or,
wherein the feeding back, by the UE, according to a preset method, an HARQ-ACK codebook corresponding to a data channel group to which data channels scheduled through the fallback DCI belong, comprises:
determining, by the UE, through DCI corresponding to an uplink grant (UL) grant, an HARQ-ACK codebook corresponding to a data channel group corresponding to a downlink HARQ process, wherein the HARQ-ACK codebook corresponding to the data channel group corresponding to the downlink HARQ process is to be fed back.

16. The method according to claim 15, wherein the determining, by the UE, through DCI corresponding to a UL grant, an HARQ-ACK codebook corresponding to a data channel group corresponding to a downlink HARQ process, comprises:
determining, by the UE, through the DCI corresponding to the UL grant, in a case where bit information comprised in the DCI corresponding to the UL grant is enabled, an HARQ-ACK codebook corresponding to the data channel group corresponding to the downlink HARQ process.

17. The method according to claim 8, the feeding back, by the UE, a HARQ-ACK codebook corresponding to a data channel group according to the CI comprising:
feeding back, by the UE, the HARQ-ACK codebook by carrying the HARQ-ACK codebook in group common downlink control information (GC-DCI), wherein the HARQ-ACK codebook is scrambled through a radio network temporary identifier (RNTI), and a time-frequency resource position where the HARQ-ACK codebook is located is transmitted through at least one of a broadcast channel or a remaining minimum system information (RMSI) channel, and wherein the CI further comprises at least one of the following: a modulation and coding scheme, MCS, or a transmit precoder matrix indicator, TPMI.

18. The method according to claim 17, further comprising:
when performing HARQ-ACK codebook feedback, acquiring, by the UE, an HARQ-ACK codebook corresponding to an uplink data channel transmitted by the UE,
wherein bit positions of the HARQ-ACK codebook corresponding to the uplink data channel is determined according to one of:
a one to one correspondence between the bit positions of the HARQ-ACK codebook and resource positions of uplink data channels or resource group positions of uplink data channels; or,
a one to one correspondence between the bit positions of the HARQ-ACK codebook and control channel element (CCE) indexes corresponding to the scheduled data channels.

19. The method according to claim 7, wherein the HARQ-ACK codebook comprises at least one of: an HARQ-ACK codebook corresponding to a currently scheduled data channel group, an HARQ-ACK codebook corresponding to a data channel group scheduled before a current time point, an HARQ-ACK codebook corresponding to a data channel group first triggered, an HARQ-ACK codebook corresponding to a data channel group re-triggered, an HARQ-ACK codebook corresponding to a data channel group autonomously transmitted, or, an HARQ-ACK codebook corresponding to a data channel group semi-continuously scheduled.

20. A non-transitory computer-readable storage medium storing a computer program, wherein the computer program, when executed by a processor, implements the codebook feedback method according to claim 7.

* * * * *